United States Patent [19]

Jennings et al.

[11] Patent Number: 4,674,479
[45] Date of Patent: Jun. 23, 1987

[54] ANTI-G SUIT

[75] Inventors: Thomas J. Jennings, Evanston, Ill.; Lloyd D. Tripp, Jr.; Lora L. Howell, both of Huber Heights, Ohio; Dimitrios G. Loukoumidis, Springfield, Ohio

[73] Assignee: The United States of America as represented by the Secretary of the Air Force, Washington, D.C.

[21] Appl. No.: 831,886

[22] Filed: Feb. 24, 1986

[51] Int. Cl.⁴ .............................................. A61B 19/00
[52] U.S. Cl. ............................. 128/1 A; 128/DIG. 2; 2/2.1 A; 2/DIG. 3
[58] Field of Search .............. 128/1 A, DIG. 20, 134; 2/2.1 A, DIG. 3

[56] References Cited

U.S. PATENT DOCUMENTS

| 2,397,709 | 4/1946 | Versoy et al. | 128/96 |
| 2,397,710 | 4/1946 | Versoy et al. | 128/1 |
| 2,886,027 | 5/1959 | Henry | 128/1 |
| 3,302,633 | 2/1967 | Vykukal | 128/1 A |
| 3,411,500 | 11/1968 | Gatts | 128/68 |
| 3,528,414 | 9/1970 | Schueller | 2/2.1 A |
| 4,039,039 | 8/1977 | Gottfried | 128/DIG. 20 |
| 4,468,821 | 9/1984 | Saunders | 128/DIG. 20 |

FOREIGN PATENT DOCUMENTS 1170402  7/1984  Canada ................................ 2/2.1 A Primary Examiner—Henry J. Recla
Attorney, Agent, or Firm—Fredric L. Sinder; Donald J. Singer

[57] ABSTRACT

An improved anti-G suit incorporates stiffening inserts sized and shaped to cover each inflatable air bladder and inserted between the bladders and the anti-G suit fabric. The stiffeners may be made of polypropylene, neoprene rubber, or a composite structure of Kevlar ® fabric and polyethylene. A butt strap covers the buttocks of an aircrew member and is secured by belts extending across the abdominal and the thigh bladders of the anti-G suit. Inflation of the air bladders pulls the butt strap belts to compress the butt strap tightly against the aircrew member's buttocks.

8 Claims, 5 Drawing Figures

ANTI-G SUIT

RIGHTS OF THE GOVERNMENT

The invention described herein may be manufactured and used by or for the Government of the United States for all governmental purposes without the payment of any royalty.

BACKGROUND OF THE INVENTION

The present invention relates generally to anti-G suits, and more particulary to anti-G suit improvements increasing the body surface area compressed by the anti-G suit.

Operation of high performance aircraft exposes an aircrew member to a high acceleration environment that pools blood into the lower body. As a result, blood flow to the retina and brain is diminished and the crew member may experience loss of vision and finally loss of consciousness. To protect against the harmful effects of high acceleration the aircrew member wears an anti-G suit comprising a cutaway pair of trousers with five sewn pockets containing inflatable air bladders. One bladder covers the front of the abdomen, and one each covers the portion of each leg in front of each thigh and each calf. The anti-G suit is connected to an anti-G valve that opens when the aircraft is exposed to +Gz accerleration, allowing pressurized air to inflate the anti-G suit bladders. The inflated bladders compress adjacent portions of the aircrew member's lower body, causing increased blood return to the heart and diminished blood flow to the lower body.

Despite the higher performance capabilities of modern aircraft, greatly increasing the acceleration risks to aircrew members, anti-G suits have remained largely unchanged since World War II. The prior art, while recognizing that increasing the body surface area compressed by an anti-G suit will increase protection, has failed to provide any satisfactory means of achieving this result. It has failed to provide solutions to problems inherent in current anti-G suits. For example, ballooning occurs when the bladders in a normal anti-G suit inflate and expand in directions away from the aircrew member's body, reducing the surface area and the total force exerted against the aircrew member's body. And, the prior art has also failed to provide satisfactory new elements for anti-G suits to increase compressed body surface area. For example, compressing the highly vascular buttocks will increase resistance to harmful G effects, but the prior art has accomplished this through the use of inflatable air bladders that surround the buttocks, having the disconcerting effect when inflated of lifting the aircrew member off the seat.

It is thus seen that there is a need for anti-G suit improvements that solve prior anti-G suit deficiencies in compressing body surface area; and, that add additional elements to increase compressed body surface area without the prior art disadvantages.

It is, therefore, a principle object of the present invention to increase the protection against harmful G effects provided by current anti-G suits by increasing the body surface area compressed by the anti-G suit.

Another object of this invention is to provide an anti-G suit that prevents ballooning of the air bladders when inflated.

Yet another object of this invention is to increase the effective body surface area compressed by the air bladders when inflated.

Still another object of this invention is to provide an anti-G suit that compresses the buttocks without lifting the wearer in the seat.

A feature of this invention is that it increases the rate of pressure rise when inflating the bladders.

An advantage of this invention is that it is more comfortable than prior art anti-G suits.

A further advantage of this invention is that it aids the wearer in performing straining and other routine maneuvers to counteract the harmful effects of high G's.

These and other objects, features and advantages of the invention will become apparent as the detailed description of certain representative embodiments proceeds.

SUMMARY OF THE INVENTION

In accordance with the foregoing principles and objects of the present invention, a novel anti-G suit is described which has stiffening inserts placed between the anti-G suit bladders and the outer fabric of the bladder pockets.

The stiffening inserts may be made of polypropylene, neoprene rubber, or a composite structure of Kevlar ® fabric and polyethylene.

The invention further includes a butt strap covering the buttocks of the wearer and secured by belts across the abdominal and thigh bladders. The butt strap is preferably made of Nomex ® fabric.

DESCRIPTION OF THE DRAWINGS

The present invention will be more clearly understood from a reading of the following detailed description in conjunction with the accompanying drawings wherein.

DETAILED DESCRIPTION

Figure 1:
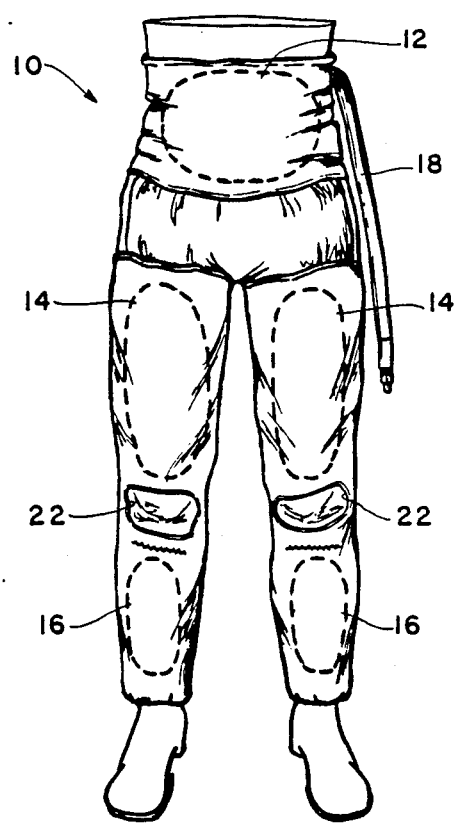
FIG. 1 is a front view of a prior art anti-G suit showing dashed line representations of air bladders.
Figure 2:
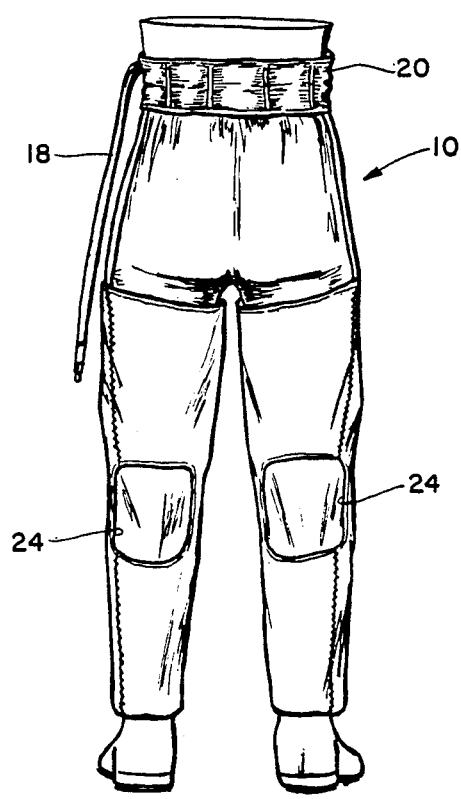
FIG. 2 is a rear view of the prior art anti-G suit.

Referring now to FIGS. 1 and 2 of the drawings, there is shown a front and a rear view of a prior art anti-G suit 10 with dashed line representations of five inflatable air bladders: one abdominal bladder 12; two thigh bladders 14; and two calf bladders 16. The air bladders are sewn inside front pockets on the anti-G suit 10 and are inflated by pressurized air supplied through the air hose 18. The anti-G suit 10 is a simple cutaway pair of trousers zipped on over a flight suit. Various zippers and straps (not shown) and a belt 20 are pulled and tightened to ensure a snug fit. Knee openings 22 and 24 provide freedom of movement.

When inflated, the bladders expand in the direction of least resistance. This results generally in a sideways ballooning of the bladders, stretching the pocket sides before the bladders begin to compress the body area beneath each bladder.

The height and width of the air bladders are approximately 10 by 16 inches for the abdominal bladder, 12 by 9.5 inches for the thigh bladders, and 14 by 5 inches for the calf bladders.

Figure 3:
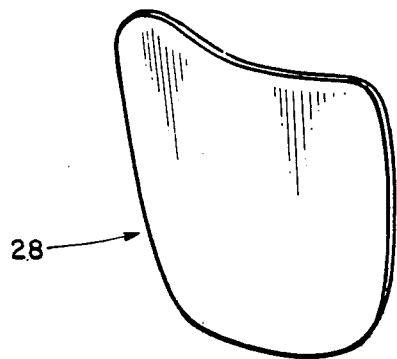
FIG. 3 is a perspective view of a thigh bladder pocket stiffening insert of the present invention.

FIG. 3 is a perspective view of a thigh bladder pocket stiffening insert 28, shaped to cover the right thigh bladder 14 and having a height and width substantially the same as the thigh bladder. Stiffening insert 28 and a mirror twin stiffening insert 29 are placed inside the pockets surrounding thigh bladders 14 between the outside of the bladders and the suit fabric, as shown in the dotted-dashed line representations in FIG. 4. Inserts 26 and 30, similarly sized and shaped to cover the remaining air bladders are inserted between the abdominal 12 and calf 16 air bladders and the suit fabric. The stiffening inserts fill the pocket area covering the bladders and pre-stretch the pockets. When the bladders are inflated, expansion in the directions away from the body is restricted, increasing both the amount of pressure and the body surface area over which pressure is applied. The inserts also increase the rate of pressure rise inside the air bladders.

The stiffening inserts may be made of, for example, $\frac{3}{8}$ inch polypropylene, $\frac{1}{4}$ inch neoprene rubber, or a composite structure of Kevlar ® fabric and polyethylene. The Kevlar ®-polyethylene composite has been found to be particularly suitable and provides additional anti-ballistic protection to aircrew members. Eight layers of Kevlar ® fabric are laminated with seven interleaving layers of 1.1 mil polyethylene. The composite is baked for one hour at 250 degrees F. in a vacuum under a −50 mm Hg pressure. The composite is cut to shape with a laser cutter.

Figure 4:
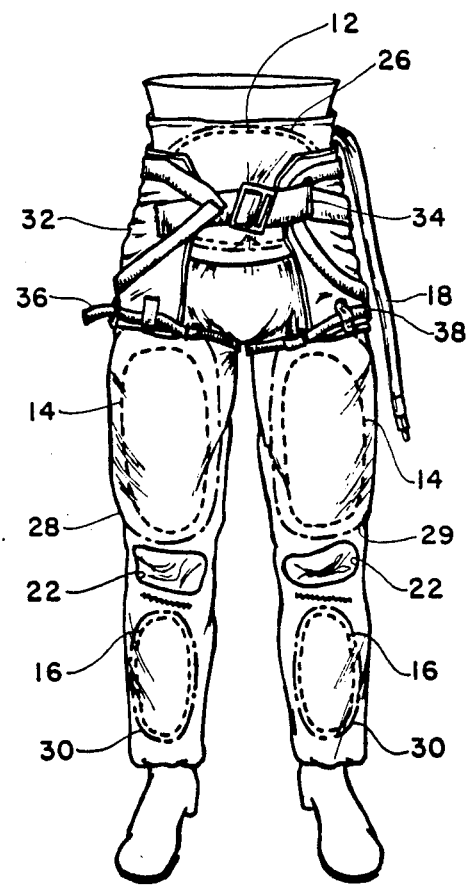
FIG. 4 is a front view of an anti-G suit incorporating the present invention showing dashed-dotted line representations of the bladder pocket stiffening inserts.
Figure 5:
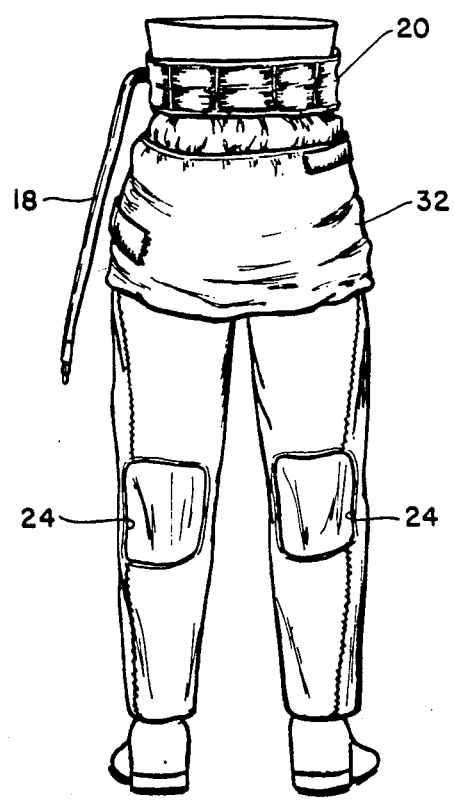
FIG. 5 is a rear view of an anti-G suit incorporating the present invention showing the placement of the butt strap of the present invention.

FIGS. 4 and 5 together show a front and rear view of an anti-G suit incorporating the present invention and disclosing the placement of a Nomex ® butt strap 32 surrounding the buttocks of the aircrew member. The butt strap 32 is held in place by three sets of belts 34, 36 and 38. Belt 34 buckles in front of the abdominal bladder 12 so that inflation of the abdominal bladder pushes forward belt 34 to pull butt strap 32 tightly against the aircrew member's buttocks. Belts 36 and 38 extend across the suit area enclosing the thigh bladders 14 to be similarly pushed forward upon bladder inflation and tighten the butt strap against the buttocks, without lifting the aircrew member off the seat.

The stiffening inserts improve the operation of the butt strap 32 by preventing the tendency of the air bladders to wrap around belts 34, 36 and 38.

The new butt strap anti-G suit increased relaxed G-tolerance by 0.45 G over standard anti-G suits in centrifuge tests. Additionally, test subjects reported increased comfort, more uniform pressure distribution, and enhanced ability to perform standard straining maneuvers. The subjects reported that the butt strap gave them a better base to strain against.

While retaining the substantial g-tolerance increasing qualities of the suit, increased maneuverability in the butt strap anti-G suit shown in FIGS 4 and 5 may be accomplished by removing the calf inserts 30 and reducing the size of the thigh inserts 28 and 29.

It is understood that certain modifications to the invention as described may be made, as might occur to one with skill in the field of this invention, within the intended scope of the claims. Therefore, all embodiments contemplated have not been shown in complete detail. Other embodiments may be developed without departing from the spirit of this invention or from the scope of the claims.

We claim:

1. An anti-G suit having pockets, comprising;
   at least one inflatable bladder placed inside a pocket; and,
   a stiffening insert substantially covering the bladder, the insert disposed between the outside surface of the bladder and the anti-G suit fabric.

2. The anti-G suit as described in claim 1, wherein the stiffening insert is made of polypropylene.

3. The anti-G suit as described in claim 1, wherein the stiffening insert is made of neoprene rubber.

4. The anti-G suit as described in claim 1, wherein the stiffening insert is made of a composite material comprising alternate layers of aromatic amide polymer fabric and plactic sheeting.

5. An anti-G suit having pockets and for wear by an aircrew member, comprising:
   inflatable bladders placed inside the pockets, one bladder covering the lower abdomen of the aircrew member;
   a butt strap of material covering the buttocks of the aircrew member;
   first belt means attached to the butt strap for fastening to the aircrew member, the first belt means extending across the anti-G suit area enclosing the abdominal bladder so that the butt strap is pulled against the buttocks when the abdominal bladder is inflated;
   one each bladder covering the front of each thigh of the aircrew member;
   second and third belt means attached to the butt strap for fastening to the aircrew member, the second and third belt means extending substantially across the anti-G suit area enclosing each thigh bladder so that the butt strap is pulled against the buttocks when the thigh bladders are inflated.

6. The anti-G suit as described in claim 5, wherein the butt strap material is a fire retardant fabric.

7. The anti-G suit as described in claim 5, further coprising stiffening inserts disposed between the outside surface of the abdominal and thigh bladders and the anti-G suit fabric.

8. An anti-G suit having a pocket over the lower abdomen of an aircrew member, comprising:
   at least one inflatable bladder placed inside the pocket;
   a stiffening insert substantially covering the bladder, the insert disposed between the outside surface of the bladder and the anti-G suit fabric;
   a butt strap of material covering the buttocks of the aircrew member; and
   belt means attached to the butt strap for fastening to the aircrew member, the belt means extending across the anti-G suit area enclosing the bladder so that the butt strap is pulled against the buttocks when the bladder is inflated.

* * * * *